United States Patent
Xia et al.

(10) Patent No.: US 10,965,417 B2
(45) Date of Patent: *Mar. 30, 2021

(54) SYSTEM AND METHOD FOR DEMODULATION REFERENCE SIGNAL OVERHEAD REDUCTION

(71) Applicant: Futurewei Technologies, Inc., Plano, TX (US)

(72) Inventors: Pengfei Xia, San Diego, CA (US); Bin Liu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,560

(22) Filed: Sep. 6, 2019

(65) Prior Publication Data

US 2019/0394004 A1 Dec. 26, 2019

Related U.S. Application Data

(63) Continuation of application No. 15/828,107, filed on Nov. 30, 2017, now Pat. No. 10,419,181.

(Continued)

(51) Int. Cl.
*H04L 5/00* (2006.01)
*H04W 72/04* (2009.01)
*H04W 76/27* (2018.01)

(52) U.S. Cl.
CPC .......... *H04L 5/0048* (2013.01); *H04L 5/0051* (2013.01); *H04W 72/042* (2013.01); *H04W 72/044* (2013.01); *H04W 76/27* (2018.02)

(58) Field of Classification Search
CPC .... H04L 5/0048; H04L 5/0051; H04W 76/27; H04W 72/042; H04W 72/044
See application file for complete search history.

(56) References Cited

U.S. PATENT DOCUMENTS

9,585,045 B2 2/2017 Lee et al.
10,419,181 B2 * 9/2019 Xia ....................... H04W 76/27
(Continued)

FOREIGN PATENT DOCUMENTS

CN 101908916 A 12/2010
CN 102076076 A 5/2011
(Continued)

OTHER PUBLICATIONS

3GPP TS 36.201 V14.1.0, 3rd Generation Partnership Project; Technical Specification Group Radio Access Network; Evolved Universal Terrestrial Radio Access (E-UTRA); LTE physical layer; General description (Release 14),Mar. 2017, 15 pages.
(Continued)

*Primary Examiner* — Mohamed A Kamara
(74) *Attorney, Agent, or Firm* — Slater Matsil, LLP (57) ABSTRACT

An embodiment method defines a demodulation reference signal (DMRS) pattern for transmitting DMRSs for rank 3 or rank 4 transmissions. The DMRS pattern specifies 12 REs in total per physical resource block (PRB) for carrying DMRSs on three or four antenna ports in antenna ports 7-14 for rank 3 or rank 4 transmissions. DMRS settings for transmitting DMRS according to the DMRS pattern may be specified using a downlink control information table.

32 Claims, 9 Drawing Sheets

Related U.S. Application Data (60) Provisional application No. 62/480,023, filed on Mar. 31, 2017, provisional application No. 62/481,648, filed on Apr. 4, 2017.

(56) References Cited

U.S. PATENT DOCUMENTS

| | | | |
|---|---|---|---|
| 2013/0064215 A1 | 3/2013 | Gao et al. | |
| 2013/0242853 A1 | 9/2013 | Seo et al. | |
| 2015/0009875 A1 | 1/2015 | Khoryaev et al. | |
| 2015/0092722 A1 | 4/2015 | Zhang et al. | |
| 2015/0092768 A1* | 4/2015 | Ng | H04W 48/16 370/350 |
| 2015/0230214 A1 | 8/2015 | Tong et al. | |
| 2018/0234221 A1* | 8/2018 | Zhang | H04W 76/27 |
| 2018/0316406 A1 | 11/2018 | Zhang et al. | |
| 2019/0013977 A1* | 1/2019 | Harrison | H04L 5/0048 |

FOREIGN PATENT DOCUMENTS

| | | |
|---|---|---|
| CN | 102781098 A | 11/2012 |
| RU | 2504076 C2 | 1/2014 |
| RU | 2556078 C2 | 7/2015 |
| RU | 2564449 C2 | 10/2015 |
| WO | WO 2012064079 A2 * | 5/2012 |
| WO | 2015042176 A1 | 3/2015 |
| WO | 2017025805 A1 | 2/2017 |
| WO | 2017026974 A1 | 2/2017 |

OTHER PUBLICATIONS

3GPP TS 36.211 V14.2.0, 3rd Generation Partnership Project; Technical Specification Group Radio Access Network; Evolved Universal Terrestrial Radio Access (E-UTRA); Physical channels and modulation(Release 14), Mar. 2017, 194 pages.

3GPP TS 36.212 V14.2.0, 3rd Generation Partnership Project; Technical Specification Group Radio Access Network; Evolved Universal Terrestrial Radio Access (E-UTRA); Multiplexing and channel coding (Release 14), Mar. 2017, 197 pages.

3rd Generation Partnership Project; Technical Specification Group Radio Access Network; Evolved Universal Terrestrial Radio Acces (E-UTRA); Multiplexing and channel coding (Release 15) 3GPP TS 36.212 V15.0.1, Jan. 2018, 214 pages.

3GPP TS 36.213 V14.2.0, 3rd Generation Partnership Project; Technical Specification Group Radio Access Network; Evolved Universal Terrestrial Radio Access (E-UTRA); Physical layer procedures (Release 14), Mar. 2017, 454 pages.

3GPP TS 36.331 V14.2.0, 3rd Generation Partnership Project; Technical Specification Group Radio Access Network; Evolved Universal Terrestrial Radio Access (E-UTRA); Radio Resource Control (RRC); Protocal specification, Mar. 2017, 721 pages.

Alcatel-Lucent Shanghai Bell et al.,"Remaining Details of DMRS Enhancement", 3GPP TSG RAN WG1 Meeting #83, R1-156715, Nov. 15-22, 2015, 3 pages, Anaheim, US.

Qualcomm Inc.,"Reduced DMRS Overhead", 3GPP TSG-RAN WG1 #88bis, R1- 1705008, Apr. 3-7, 2017, 3 pages,Spokane, USA.

* cited by examiner

| ONE CODEWORD: CODEWORD 0 ENABLED, CODEWORD 1 DISABLED | | TWO CODEWORDS: CODEWORD 0 ENABLED, CODEWORD 1 ENABLED | |
|---|---|---|---|
| VALUE | MESSAGE | VALUE | MESSAGE |
| 0 | 1 LAYER, PORT 7, $n_{SCID}=0$ (OCC=2) | 0 | 2 LAYERS, PORTS 7-8, $n_{SCID}=0$ (OCC=2) |
| 1 | 1 LAYER, PORT 7, $n_{SCID}=1$ (OCC=2) | 1 | 2 LAYERS, PORTS 7-8, $n_{SCID}=1$ (OCC=2) |
| 2 | 1 LAYER, PORT 8, $n_{SCID}=0$ (OCC=2) | 2 | 2 LAYERS, PORTS 7-8, $n_{SCID}=0$ (OCC=4) |
| 3 | 1 LAYER, PORT 8, $n_{SCID}=1$ (OCC=2) | 3 | 2 LAYERS, PORTS 7-8, $n_{SCID}=1$ (OCC=4) |
| 4 | 1 LAYER, PORT 7, $n_{SCID}=0$ (OCC=4) | 4 | 2 LAYERS, PORTS 11,13, $n_{SCID}=0$ (OCC=4) |
| 5 | 1 LAYER, PORT 7, $n_{SCID}=1$ (OCC=4) | 5 | 2 LAYERS, PORTS 11,13, $n_{SCID}=1$ (OCC=4) |
| 6 | 1 LAYER, PORT 8, $n_{SCID}=0$ (OCC=4) | 6 | 3 LAYERS, PORTS 7-9 |
| 7 | 1 LAYER, PORT 8, $n_{SCID}=1$ (OCC=4) | 7 | 4 LAYERS, PORTS 7-10 |
| 8 | 1 LAYER, PORT 11, $n_{SCID}=0$ (OCC=4) | 8 | 5 LAYERS, PORTS 7-11 |
| 9 | 1 LAYER, PORT 11, $n_{SCID}=1$ (OCC=4) | 9 | 6 LAYERS, PORTS 7-12 |
| 10 | 1 LAYER, PORT 13, $n_{SCID}=0$ (OCC=4) | 10 | 7 LAYERS, PORTS 7-13 |
| 11 | 1 LAYER, PORT 13, $n_{SCID}=1$ (OCC=4) | 11 | 8 LAYERS, PORTS 7-14 |
| 12 | 2 LAYERS, PORTS 7-8 | 12 | RESERVED |
| 13 | 3 LAYERS, PORTS 7-9 | 13 | RESERVED |
| 14 | 4 LAYERS, PORTS 7-10 | 14 | RESERVED |
| 15 | RESERVED | 15 | RESERVED |

FIG. 8

| ONE CODEWORD: CODEWORD 0 ENABLED, CODEWORD 1 DISABLED | | TWO CODEWORDS: CODEWORD 0 ENABLED, CODEWORD 1 ENABLED | |
|---|---|---|---|
| VALUE | MESSAGE | VALUE | MESSAGE |
| 0 | 1 LAYER, PORT 7, $n_{SCID}=0$ (OCC=2) | 0 | 2 LAYERS, PORTS 7-8, $n_{SCID}=0$ (OCC=2) |
| 1 | 1 LAYER, PORT 7, $n_{SCID}=1$ (OCC=2) | 1 | 2 LAYERS, PORTS 7-8, $n_{SCID}=1$ (OCC=2) |
| 2 | 1 LAYER, PORT 8, $n_{SCID}=0$ (OCC=2) | 2 | 2 LAYERS, PORTS 7-8, $n_{SCID}=0$ (OCC=4) |
| 3 | 1 LAYER, PORT 8, $n_{SCID}=1$ (OCC=2) | 3 | 2 LAYERS, PORTS 7-8, $n_{SCID}=1$ (OCC=4) |
| 4 | 1 LAYER, PORT 7, $n_{SCID}=0$ (OCC=4) | 4 | 2 LAYERS, PORTS 11,13, $n_{SCID}=0$ (OCC=4) |
| 5 | 1 LAYER, PORT 7, $n_{SCID}=1$ (OCC=4) | 5 | 2 LAYERS, PORTS 11,13, $n_{SCID}=1$ (OCC=4) |
| 6 | 1 LAYER, PORT 8, $n_{SCID}=0$ (OCC=4) | 6 | 3 LAYERS, PORTS 7-9 |
| 7 | 1 LAYER, PORT 8, $n_{SCID}=1$ (OCC=4) | 7 | 4 LAYERS, PORTS 7-10 |
| 8 | 1 LAYER, PORT 11, $n_{SCID}=0$ (OCC=4) | 8 | 5 LAYERS, PORTS 7-11 |
| 9 | 1 LAYER, PORT 11, $n_{SCID}=1$ (OCC=4) | 9 | 6 LAYERS, PORTS 7-12 |
| 10 | 1 LAYER, PORT 13, $n_{SCID}=0$ (OCC=4) | 10 | 7 LAYERS, PORTS 7-13 |
| 11 | 1 LAYER, PORT 13, $n_{SCID}=1$ (OCC=4) | 11 | 8 LAYERS, PORTS 7-14 |
| 12 | 2 LAYERS, PORTS 7-8 | 12 | NEW ENTRY FOR RANK 3 (e.g., 3 LAYERS, PORTS 7,8,11, OCC=4) |
| 13 | 3 LAYERS, PORTS 7-9 | 13 | NEW ENTRY FOR RANK 4 (e.g., 4 LAYERS, PORTS 7,8,11,13, OCC=4) |
| 14 | 4 LAYERS, PORTS 7-10 | 14 | RESERVED |
| 15 | RESERVED | 15 | RESERVED |

SYSTEM AND METHOD FOR DEMODULATION REFERENCE SIGNAL OVERHEAD REDUCTION

CROSS-REFERENCE TO RELATED APPLICATIONS

This application is a continuation of U.S. application Ser. No. 15/828,107, filed on Nov. 30, 2017 and entitled "System and Method for Demodulation Reference Signal Overhead Reduction", which claims priority to U.S. Provisional Application No. 62/480,023, filed on Mar. 31, 2017 and entitled "Demodulation Reference Signal (DMRS) Overhead Reduction System and Method", and U.S. Provisional Application No. 62/481,648, filed on Apr. 4, 2017 and entitled "Demodulation Reference Signal (DMRS) Overhead Reduction Systems and Methods", each of which is hereby incorporated by reference herein as if reproduced in its entirety.

TECHNICAL FIELD

The present invention relates generally to managing the allocation of resources in a network, and in particular embodiments, to techniques and mechanisms for a system and method for demodulation reference signal overhead reduction.

BACKGROUND

For downlink demodulations, Long Term Evolution (LTE) specifications define demodulation reference signals (DMRSs) to enable UEs to estimate the reference signals and derive channel equalizers for data equalization and channel decoding. The DMRSs may be carried in specific resource elements (REs) in each slot and the location of the REs may be specifically determined according to antenna configurations (or transmission modes). For different antenna ports, different REs for carrying the DMRSs are used with different orthogonal cover code (OCC) schemes, resulting in different overhead, and different channel estimation accuracy.

SUMMARY

Technical advantages are generally achieved, by embodiments of this disclosure which describe a system and method for demodulation reference signal overhead reduction.

According to one aspect of the present disclosure, there is provided a method implemented by an access node. The method includes transmitting a downlink control message comprising a value, the value specifying a 3-layer downlink data transmission from antenna ports 7, 8 and 11, and that orthogonal codes of a length 4 are to be applied to demodulation reference signals for the 3-layer downlink data transmission.

According to another aspect of the present disclosure, there is provided a method implemented by an access node that includes transmitting a downlink control message comprising a value, the value specifying a 4-layer downlink data transmission from antenna ports 7, 8, 11 and 13, and that orthogonal codes of a length 4 are to be applied on to demodulation reference signals for the 4-layer downlink data transmission.

According to yet another aspect of the present disclosure, there is provided an apparatus that includes a non-transitory memory storage comprising instructions; and one or more processors in communication with the memory storage, wherein the one or more processors execute the instructions to transmit a downlink control message comprising a value, the value specifying a 3-layer downlink data transmission from antenna ports 7, 8 and 11, and that orthogonal codes of a length 4 are to be applied to demodulation reference signals for the 3-layer downlink data transmission.

According to yet another aspect of the present disclosure, there is provided an apparatus that includes a non-transitory memory storage comprising instructions; and one or more processors in communication with the memory storage, wherein the one or more processors execute the instructions to transmit a downlink control message comprising a value, the value specifying a 4-layer downlink data transmission from antenna ports 7, 8, 11 and 13, and that orthogonal codes of a length 4 are to be applied to demodulation reference signals for the 4-layer downlink data transmission.

Optionally, in any of the preceding aspects, the value is an index of an entry in a lookup table.

Optionally, in any of the preceding aspects, the method further includes transmitting an identifier of the lookup table in a radio resource control (RRC) message, the identifier identifying the lookup table from a plurality of lookup tables.

Optionally, in any of the preceding aspects, the value further specifies a scrambling identity of 0.

Optionally, in any of the preceding aspects, the value is effective when two codewords are enabled for the 3-layer downlink data transmission.

Optionally, in any of the preceding aspects, each of the orthogonal codes is one of [1 1 1 1], [1 −1 1 −1], [1 1 −1 −1], or [1 −1 −1 1].

According to yet another aspect of the present disclosure, there is provided a method that includes transmitting, by an access node, demodulation reference signals for a 3-layer data transmission, wherein orthogonal codes of a length 4 are applied to the demodulation reference signals, and the demodulation reference signals are transmitted over antenna port 7, antenna port 8, and antenna port 11.

According to yet another aspect of the present disclosure, there is provided a method that includes transmitting, by an access node, demodulation reference signals for a 4-layer data transmission, wherein orthogonal codes of a length 4 are applied to the demodulation reference signals, and the demodulation reference signals are transmitted over antenna port 7, antenna port 8, antenna port 11, and antenna port 13.

Optionally, in any of the preceding aspects, the orthogonal codes comprise [1 1 1 1], [1 −1 1 −1], [1 1 −1 −1], and [1 −1 −1 1].

Optionally, in any of the preceding aspects, the 3-layer data transmission uses two codewords.

Optionally, in any of the preceding aspects, the 4-layer data transmission uses two codewords.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Embodiments of the present disclosure provide methods for transmitting demodulation reference signals (DMRSs). In some embodiments, DMRS patterns are defined for rank 3 and/or rank 4 transmissions. A DMRS pattern defines a plurality of REs per physical resource block (PRB) for carrying DMRSs. In the embodiments, twelve (12) resource elements (RE) in total in a PRB are defined for carrying DMRSs for 3-layer or 4-layer transmissions. The 3-layer or 4-layer transmissions may be performed using any three or four antenna ports in port 7 through port 14. An orthogonal code with a length of 4 may be used to differentiate the DMRSs transmitted via different antenna ports. In some embodiments, DMRS settings for transmitting DMRSs according to a defined DMRS pattern for rank 3 or rank 4 transmissions may be defined and transmitted by an access node, such as a base station. A DMRS setting may specify information about a number of transmission layers, such as layer 1, layer 2, layer 3, a number of antenna ports for performing rank 3 or rank 4 transmissions, and an orthogonal code with a length of 4, to be used for transmitting DMRSs. The DMRS settings may be added as new entries in an existing Lookup table using reserved entries, or replacing existing entries. A new downlink control information (DCI) table may also be created to specify the DMRS settings. The embodiment methods use 12 REs, instead of 24 REs in conventional methods, per PRB to carry DMRSs for rank 3 and/or rank 4 transmissions, and greatly reduce DMRS overhead. For example, an access node may transmit DMRSs for a 3-layer data transmission, where the DMRSs are transmitted over three antenna ports and occupy twelve resource elements for each associated resource block. In another example, an access node may transmit DMRSs for a 4-layer data transmission, where the DMRSs are transmitted over four antenna ports and occupy twelve resource elements for each associated resource block.

Figure 1:
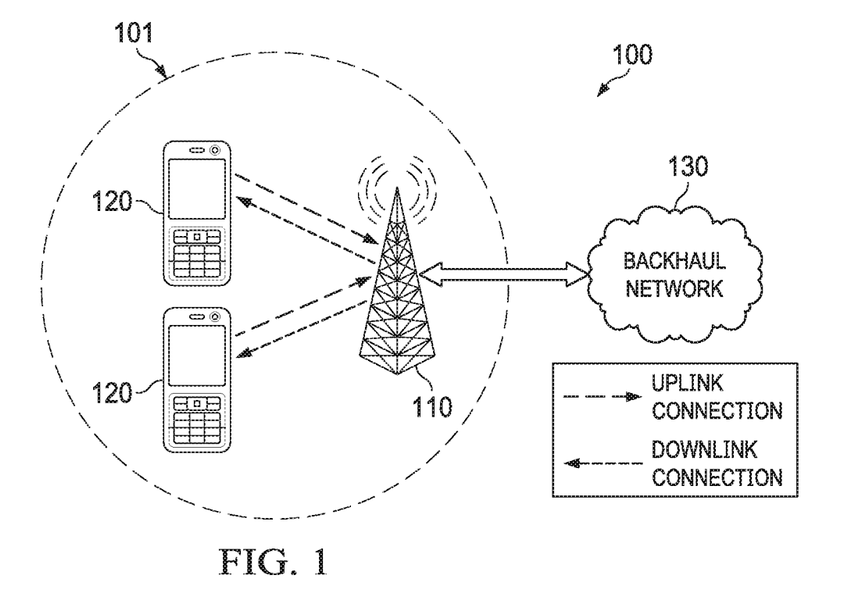
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

For downlink demodulations, LTE specifications define demodulation reference signals (DMRSs) to enable UEs to estimate the reference signals and derive channel equalizers for data equalization and channel decoding. The DMRSs may be carried in resource elements (REs) in an orthogonal frequency division multiplexing (OFDM) time-frequency grid in each slot. The OFDM time-frequency grid specifies time-frequency resources including OFDM symbols in the time domain and subcarriers in the frequency domain. A RE is defined by a time-frequency resource within one OFDM symbol and one subcarrier. Positions of the REs carrying the DMRSs in the OFDM time-frequency grid may vary, resulting in different DMRS patterns. Each DMRS pattern specifies a plurality of REs per physical resource block (PRB) of the OFDM time-frequency grid for carrying DMRSs. Throughout this disclosure, the terms of "PRB" and "RB" are used interchangeably. A DMRS pattern is associated with a RB.

LTE defines different ranks of transmissions corresponding to different layers of transmissions that are performed via different antenna ports. For example, LTE defines rank 1-8 (1-8 layers) transmissions. Rank 1 and rank 2 transmissions include layer 1 and layer 2 transmissions mapped to antenna ports 7 and 8, respectively. Rank 3 and rank 4 transmissions include layer 1 to layer 4 transmissions that are mapped to antenna ports 7, 8, 9, 10, respectively. Rank 5 to rank 8 transmissions include layer 1 to layer 8 transmissions that are mapped to antenna ports 7-14 respectively. For different antenna ports, different DMRS patterns are defined and used, together with different orthogonal cover code (OCC) schemes. Different DMRS patterns require different overhead and result in different channel estimation accuracy. In general, low-to-no-mobility users, e.g., loosely fixed wireless access (FWA) users, require less DMRS overhead to satisfy demodulation decoding requirements than users with mobility. Throughout the disclosure, the terms "port" and "antenna port" are used interchangeably.

Figure 2:
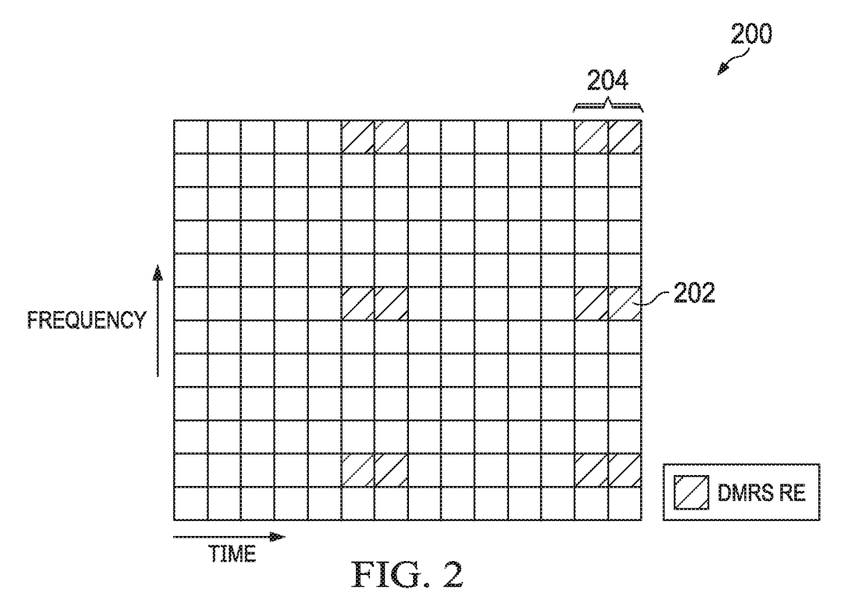
FIG. 2 illustrates a diagram of an embodiment demodulation reference signal (DMRS) pattern.

FIG. 2 illustrates a diagram of a DMRS pattern for rank 1 and rank 2 transmissions, from 3GPP TS.36.212. In this example DMRS pattern, 12 REs per RB are used to carry DMRSs for port 7 and port 8. FIG. 2 shows a RB 200 in the OFDM time-frequency grid, including 14 symbols in the time domain and 12 subcarriers in the frequency domain, i.e., 14*12=168 REs in the RB 200. The RB 200 includes 12 REs 202 (shaded with diagonal lines) for transmitting DMRSs. The 12 REs may be referred to as DMRS REs. In this example, all of the 12 REs are occupied transmitting DMRSs for either port 7 or port 8. Different OCC 2 codes are used when transmitting DMRSs for port 7 and 8 so that receivers can determine whether DMRSs received are from port 7 or port 8. For example, an OCC 2 code [1 1] may be applied to DMRSs transmitted via port 7, and an OCC 2 code [1 –1] may be applied to DMRSs transmitted via port 8. As shown, the 12 REs 202 are divided into 6 RE pairs 204, and each pair includes two REs having the same subcarrier and OFDM symbols that are adjacent to each other. In an example implementation, each pair 204 (i.e., two REs) may be multiplied by an OCC 2 code that is determined or selected for a particular port.

Figure 3:
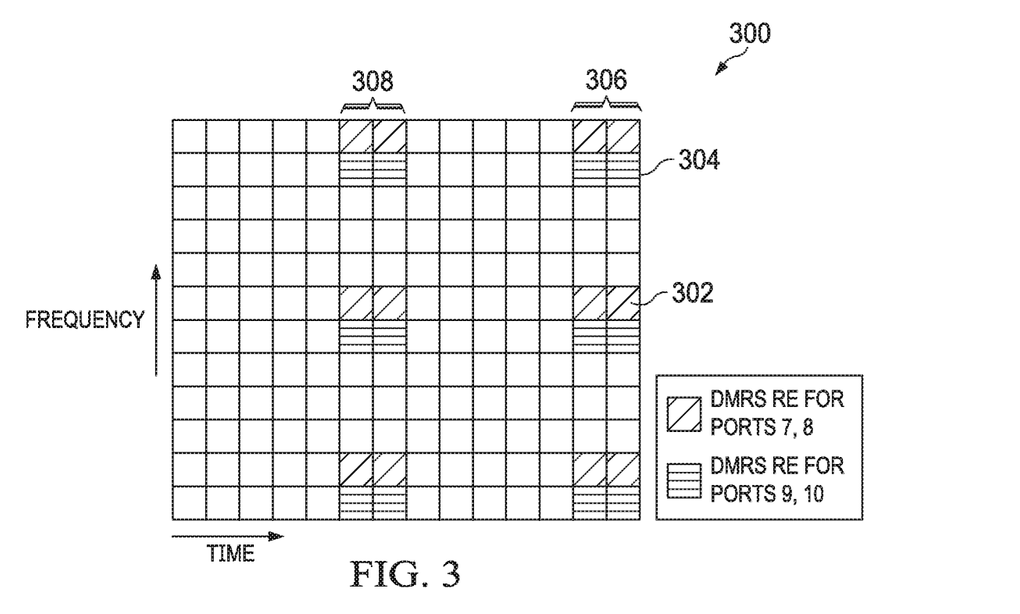
FIG. 3 illustrates a diagram of another embodiment DMRS pattern.

FIG. 3 illustrates a diagram of a DMRS pattern for rank 3 and rank 4 transmissions. In this example DMRS pattern, 24 REs per RB are defined to carry DMRSs for layer 1, layer 2, layer 3, and layer 4 transmissions corresponding to four ports, i.e., port 7, port 8, port 9 and port 10. For rank 3 transmissions, 3 layers of transmission are performed via three of the four ports. For rank 4 transmissions, 4 layers of transmission are performed via the four ports. FIG. 3 shows that a RB 300 having 168 REs includes 24 DMRS REs for carrying DMRSs for layer 1, layer 2, layer 3, and layer 4 transmissions. For DMRSs transmitted via port 7 or port 8, 12 REs 302 (shaded with diagonal lines) are occupied. For DMRSs transmitted via port 9 or port 10, 12 REs 304 (shaded with horizontal lines) are occupied. Different OCC 2 codes are used when transmitting DMRSs for port 7 and 8. Similarly, different OCC 2 codes are used when transmitting DMRSs for port 9 and 10. As shown, the 12 REs 302 are divided into 6 RE pairs 306, and each pair includes two REs having the same subcarrier and different OFDM symbols that are adjacent to each other. Similarly, the 12 REs 304 are divided into 6 RE pairs 308, and each pair includes two REs having the same subcarrier and different OFDM symbols that are adjacent to each other. Locations of the REs 302 or 304 may be different from what is shown in FIG. 3.

Figure 4:
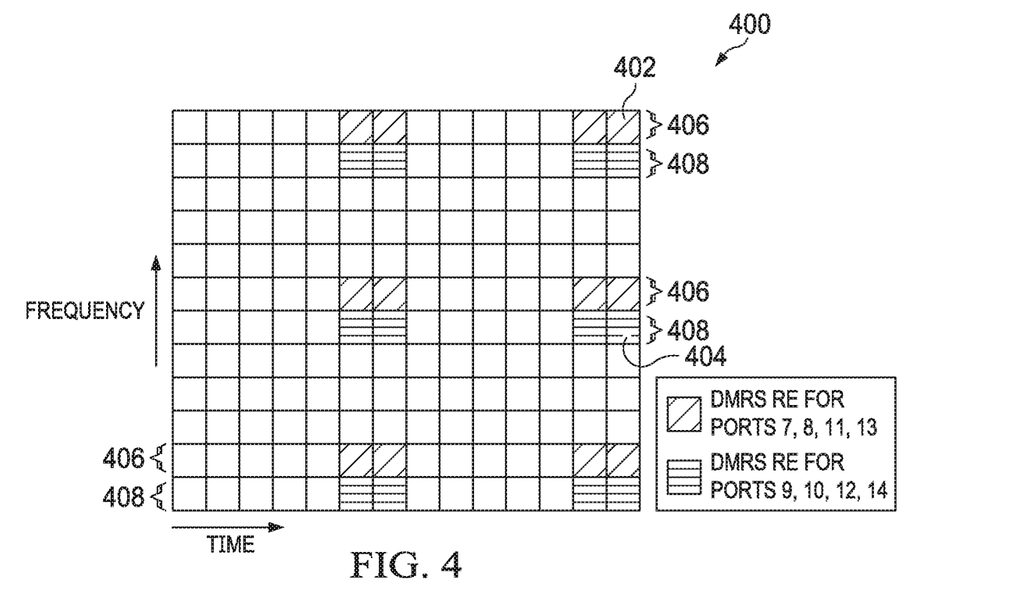
FIG. 4 illustrates a diagram of yet another embodiment DMRS pattern.

FIG. 4 illustrates a diagram of a DMRS pattern for rank 5, rank 6, rank 7 and rank 8 transmissions. In this example DMRS pattern, 24 REs per RB are defined to carry DMRSs for layer 1 to layer 8 transmissions corresponding to port 7 to port 14. As shown, a RB 400 having 168 REs includes 24 DMRS REs for carrying DMRSs. For DMRSs transmitted via port 7, port 8, port 11 and port 13, 12 REs 402 (shaded with diagonal lines) are occupied. For DMRSs transmitted via port 9, port 10, port 12 and port 14, 12 REs 404 (shaded with horizontal lines) are occupied. Different OCC 4 codes are used when transmitting DMRSs for port 7, port 8, port 11 and port 13, so that a receiver is able to differentiate DMRSs that it has received from these ports. For example, an OCC 4 code [1 1 1 1] may be applied to DMRSs for port 7, an OCC 4 code [1 –1 1 –1] may be applied to DMRSs for port 8, an OCC 4 code [1 1 –1 –1] may be applied to DMRSs for port 11, and an OCC 4 code [–1 –1 1 1] may be applied to DMRSs for port 13. Similarly, different OCC 4 codes are used when transmitting DMRSs for port 9, port 10, port 12 and port 14. As shown, the 12 REs 402 are divided into three groups 406, and each group 406 includes four REs in the same row (i.e., the four REs have the same subcarrier). Each group may also be referred to as a quadruplet. Similarly, the 12 REs 404 are divided into three quadruplets 408, and each quadruplet 408 includes four REs in the same row. In an example implementation for applying OCC 4 codes to the DMRSs, each quadruplet of the REs 406 or 408 may be multiplied by an OCC 4 code that is specified for a corresponding antenna port.

Different DMRS patterns used for different layers of transmissions generate different DMRS overhead. In some embodiments, the DMRS overhead may be determined by a number of REs per RB that are used for carrying DMRS per port. For example, in rank 1 or rank 2 transmissions, 12 REs are used for transmitting DMRS via two ports. Thus the overhead may be shown by 12/2=6 REs per rank per port. For rank 3 or rank 4 transmissions, where 24 REs are employed for four ports, the overhead is 24/4=6 REs per rank per port. For rank 5 through rank 8 transmissions, where 24 REs are employed for eight ports, the overhead will be 24/8=3 REs per rank per port.

Embodiments of the present disclosure provide a method for reducing DMRS overhead for rank 3 and rank 4 transmissions corresponding to layer 1, layer 2, layer 3 and layer 4 transmissions. Specifically, according to one embodiment, the same 12 REs per RB are used for transmitting DMRSs via four ports in layer 1, layer 2, layer 3 and layer 4 transmissions. In this case, OCC 4 codes (instead of OCC 2 codes) are employed to differentiate between DMRSs transmitted via the four ports. By using 12 REs per RB, instead of 24 REs as illustrated in FIG. 3, overhead is reduced by 50%, i.e., 12/4=3 REs per rank per port.

Figure 5:
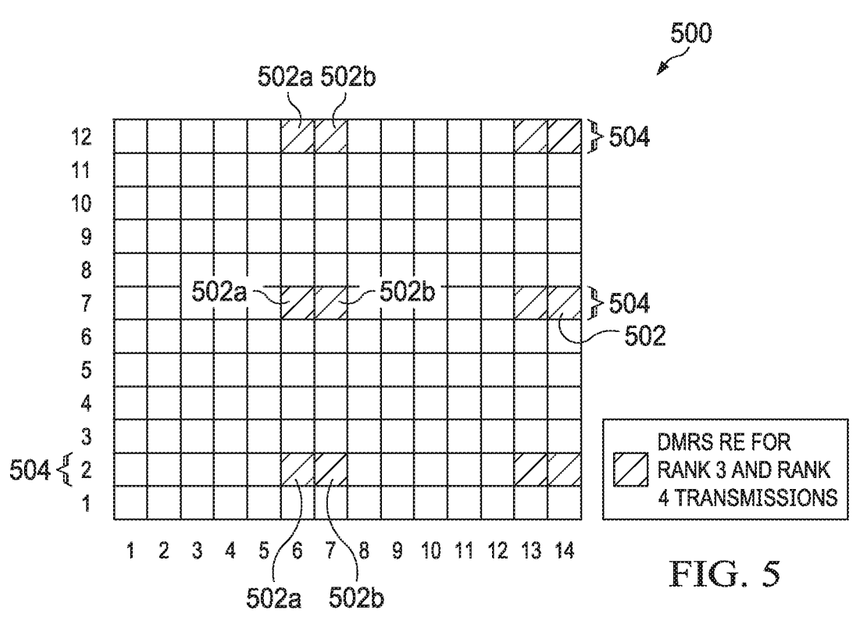
FIG. 5 illustrates a diagram of an embodiment DMRS pattern for rank 3 or rank 4 transmissions.

FIG. 5 illustrates a diagram of an embodiment DMRS pattern for rank 3 and rank 4 transmissions. FIG. 5 shows that a RB 500 having 168 REs includes 12 DMRS REs 502 in total for carrying DMRSs for rank 3 and rank 4 transmissions via four antenna ports. The same 12 REs 502 will be used for transmitting DMRSs for each of the four ports. In some embodiments, the four ports may include any four ports selected from port 7 through port 14. For example, the four ports may be ports 7, 8, 9, and 10. In another example, the four ports may be ports 7, 8, 11 and 13. In yet another example, the four ports may be ports 9, 10, 12 and 14. For rank 3 transmissions, there will be up to 3 layers of transmissions to be performed via three of the four ports. For example, ports 7, 8, 11 may be used for rank 3 transmissions. In another example, 9, 10, 12 may be used for rank 3 transmissions. For rank 4 transmissions, there will be up to 4 layers of transmissions to be performed via the four ports. For example, ports 7, 8, 11, 13, or ports 9, 10, 12 and 14 may be used for rank 4 transmissions. The four ports may be predetermined or preconfigured, or dynamically configured for rank 3 or rank 4 transmissions. Information about which ports (e.g., number of the ports) are used for a rank 3 or a rank 4 transmission may be communicated in a message, such as a radio resource control (RRC) message, or a downlink control message. For example, an access node may transmit a downlink control message including such information. In this embodiment, ports 7, 8, 11 and 13 are used as an example for rank 3 and rank 4 transmissions. Ports 9, 10, 12, and 14 may be used, as an example, for rank 3 and rank 4 transmissions.

In some embodiments, different OCC 4 codes may be used when transmitting DMRSs for port 7, port 8, port 11 and port 13 to distinguish DMRSs transmitted via these ports. For example, OCC 4 codes [1 1 1 1], [1 −1 1 −1], [1 1 −1 −1], and [1 −1 −1 1] may be assigned to port 7, port 8, port 11 and port 13, respectively. Other orthogonal codes are possible and may also be used such that receivers are able to determine which of the four ports transmits which of the DMRSs that they have received. As shown, the 12 REs 502 are divided into three groups 504, and each group 504 includes four REs in the same row (i.e., the four REs have the same subcarrier). Within each group, the four REs may be viewed to be divided into two pairs, and each pair includes two REs located in adjacent OFDM symbols (or the two REs are located adjacently in the time domain). When applying an OCC 4 code that is specified for a corresponding antenna port, each group of REs (i.e., a quadruplet of REs) 504 may be multiplied by the OCC 4 code. In this case, each group may also be referred to as an OCC 4 group. Each RE may be identified using a symbol index and a subcarrier index, e.g., (symbol index, subcarrier index). For example, the group of four REs on the top row may be represented by (6, 12), (7, 12), (13, 12) and (14, 12). As also shown, the REs in different OCC groups 504 are aligned with one another in the time domain. For example, the RE 502a in the three OCC groups are all aligned with one another in the time domain (i.e., they are located in the same OFDM symbol). Similarly, the REs 502b in the three OCC groups 504 are all aligned with one another in the time domain.

Figure 6:
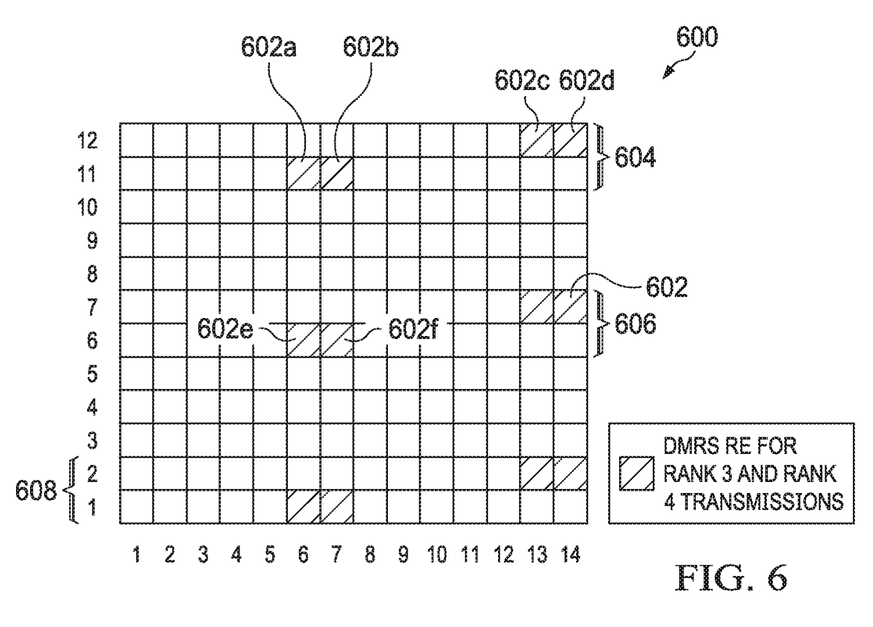
FIG. 6 illustrates a diagram of another embodiment DMRS pattern for rank 3 or rank 4 transmissions.

The 12 REs in the embodiment carrying DMRSs for rank 3 and rank 4 transmissions may be located differently than that illustrated in FIG. 5. In some embodiments, the 12 REs in the embodiment may be located in REs that have been specified in a standard or that have existed (e.g., an LTE standard) for carrying DMRSs. For example, the 12 REs in the embodiment of FIG. 5 have locations that are the same as that of the 12 REs defined for ports 7 and 8 as illustrated in FIG. 3. In another example, the 12 REs in the embodiment of FIG. 5 may have locations that are the same as that of the REs defined for ports 9 and 10 as illustrated in FIG. 3. In some embodiments, the 4 REs in each OCC group may be located in different rows (i.e., different subcarriers in the frequency domain). As shown in FIG. 6, a RB 600 includes 12 REs 602 for carrying DMRSs. The 12 REs are divided into three OCC groups 604, 606 and 608 each including four REs. As shown, the four REs in each OCC group 604, 606 608 are not located in the same row. For example, RE 602a and RE 602b in the OCC group 604 are located in subcarrier with an index number 11 (subcarrier 11), while RE 602c and RE 602d in the OCC group 604 are located in subcarrier 12. In another example, REs in an OCC group may be located in subcarriers that are different than one another.

As also shown in FIG. 6, the REs in the OCC groups 604, 606 and 608 are aligned with one another in the time domain. However, in some embodiments, REs in one OCC group may not align with REs in another OCC group of a DMRS pattern. For example, RE 602e and 602f in the OCC group 606 may be located in symbols with indexes of 5 and 6 (i.e., symbol 5 and symbol 6) or in symbol 3 and symbol 4, respectively, while RE 602a and 602b in the OCC group 604 are located in symbol 6 and symbol 7, respectively. In some embodiments, each RE in one OCC group may be located in a symbol that is different than a RE in another OCC group. The 12 REs in the embodiment carrying DMRSs for rank 3 and rank 4 transmissions may be located in various positions within a RB. For example, the 12 REs may be evenly distributed in the RB. In another example, the 12 REs may also be randomly distributed in the RB. Locations of the 12 REs may be determined based on various transmission requirements, such as a latency requirement for transmitting data or control information.

Figure 7:
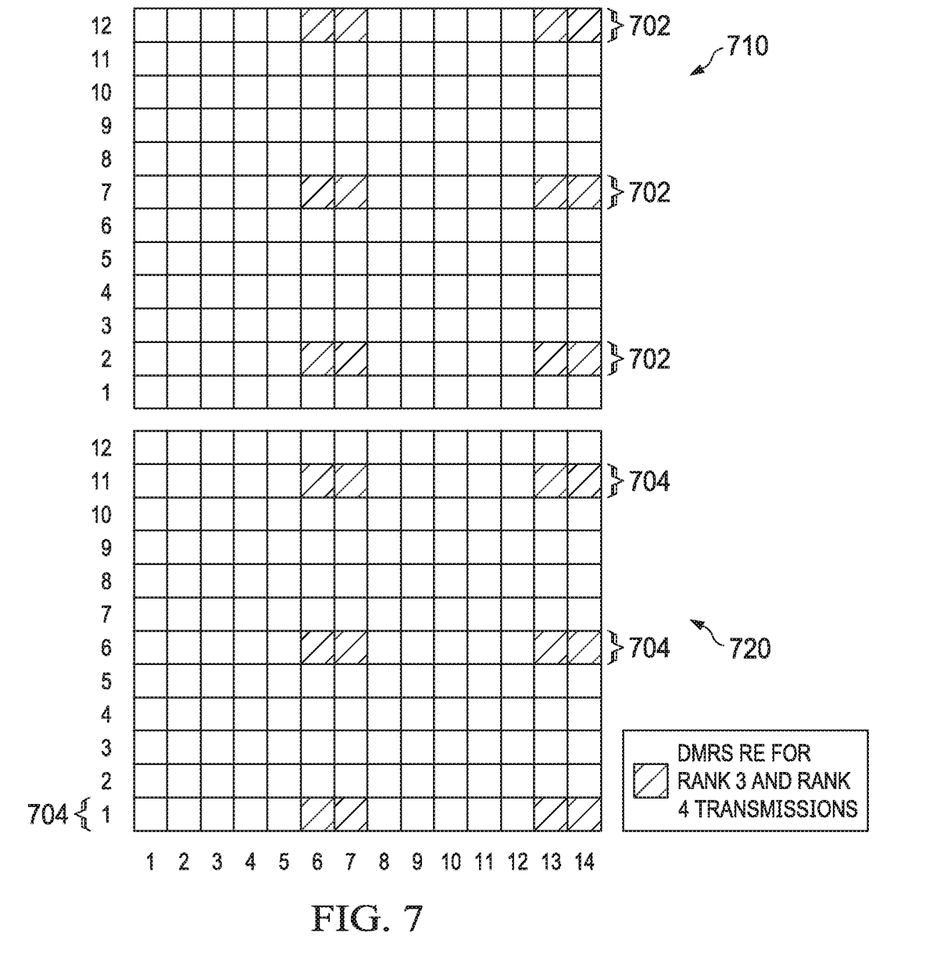
FIG. 7 illustrates a diagram of embodiment DMRS patterns for rank 3 or rank 4 transmissions.

In some embodiments, different RBs may use different DMRS patterns. FIG. 7 illustrates a diagram showing two different DMRS patterns used in RB 710 and RB 720 according to an embodiment of the present disclosure. The RB 710 and RB 720 may be an odd RB and an even RB, respectively. As shown, each of the RB 710 and RB 720 has 12 REs for transmitting DMRS patterns for rank 3 and rank 4 transmissions. The 12 REs in RB 710 are divided into three OCC groups 702, and the 12 REs in RB 710 are divided into three OCC groups 704. However, the REs in OCC groups 702 of RB 710 are located in subcarriers 2, 7 and 12, respectively, while the REs in OCC groups 704 of RB 720 are located in subcarriers 1, 6 and 11, respectively. Other variations for using different DMRS patterns for different RBs are possible. For example, a plurality of sets of RBs may be scheduled for a UE, and each set may use one DMRS pattern that is different than others.

In some embodiments, a plurality of DMRS patterns for rank 3 and rank 4 transmissions may be pre-configured. Each DMRS pattern includes 12 REs per RB for carrying DMRSs, with corresponding locations within the RB. A transmitter, such as a base station, may determine or select one or more DMRS patterns to be used for each transmission. In one embodiment, the transmitter may transmit to a receiver, such as a UE, information about a DMRS pattern used for transmitting DMRSs during a rank 3 or a rank 4 transmission. The information about the DMRS pattern may include a DMRS pattern identifier identifying the DMRS pattern. The information about a DMRS pattern may include a number of REs that carry DMRS per PRB, or locations of the REs per PRB. In another embodiment, a DMRS pattern for rank 3 and rank 4 transmissions may be predetermined and specified as a priori knowledge to both the transmitter and the receiver. For example, the DMRS pattern may be specified in a technical specification of a standard. In this case, the receiver that receives a rank 3 or a rank 4 transmission will readily understand which REs in a RB carry the DMRSs based on the a priori knowledge.

Figure 8:
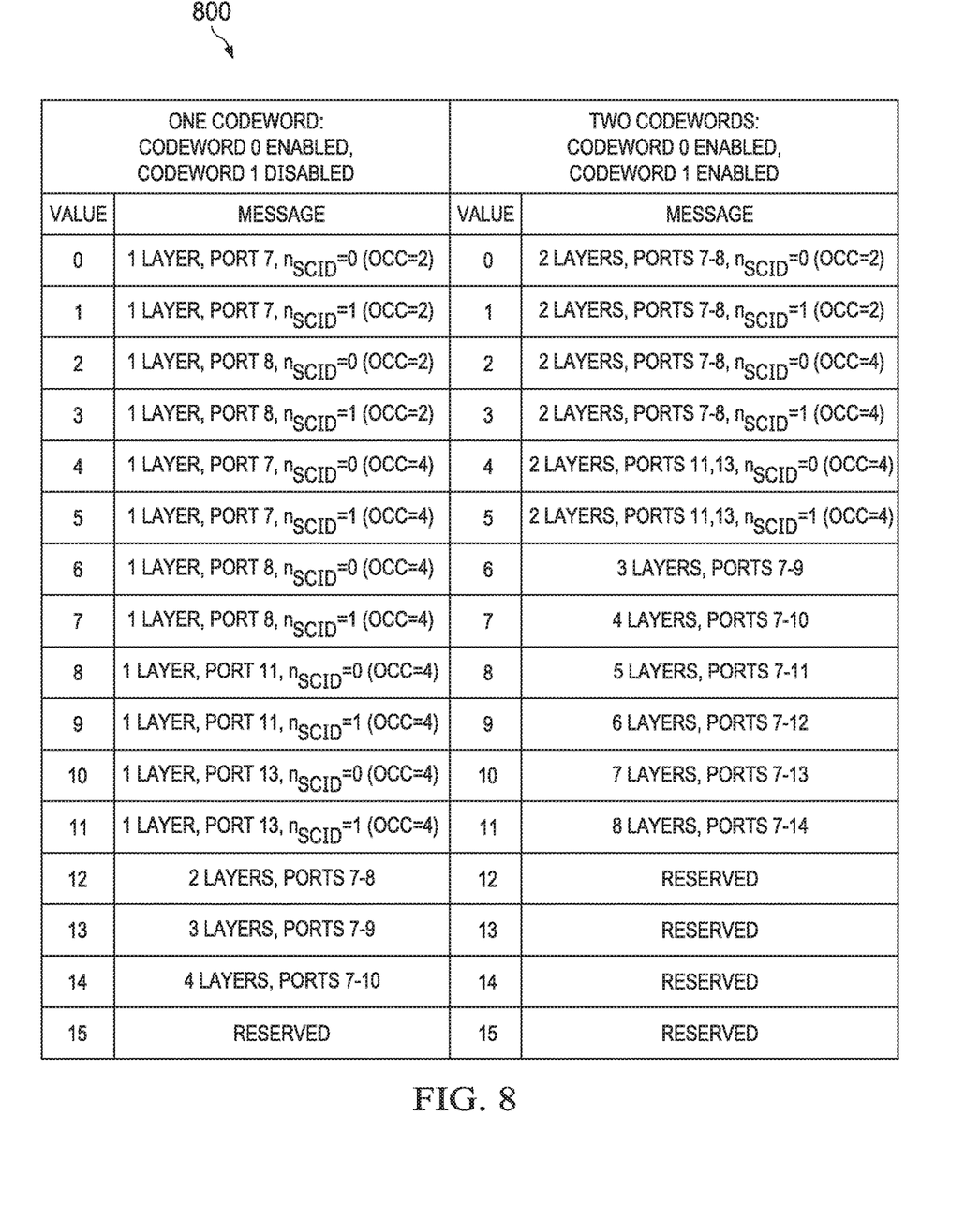
FIG. 8 illustrates an embodiment downlink control information (DCI) table.

In some embodiments, information for transmitting DMRSs may also be transmitted to a receiver. The information may include a number of transmission layers, one or more antenna ports for performing transmissions in the transmission layers, and an OCC code that is used for transmitting DMRSs. The DMRS setting may also include other information, such as a scrambling identity. The information may be referred to as DMRS settings. A DMRS setting may be communicated to UEs using radio resource control (RRC) message or downlink control information (DCI) messages. The receiver identifies the DMRSs transmitted via an antenna port based on the DMRS setting received. Conventionally, each DCI message may specify a DMRS setting according to a lookup table. For example, the lookup table may be a DCI table. Both the transmitter and the receiver can access the lookup table. FIG. 8 illustrates a DCI table 800 (Table 5.3.3.1.5C-2) that is specified in the Technical Specification of 3GPP TS.36.212. The DCI table 800 includes a plurality of message values (i.e., values in the column of "value"), and each message value corresponds to information (i.e., information in the column of "message") for transmitting DMRSs. The message values may also be referred to as indexes of entries in the DCI table, and each index corresponds to a DMRS setting. For example, an index 3 (message value of 3) under a column of "Two Codewords" corresponds to a DMRS setting of [2 layers, port 7-8, $n_{SCID}$=1(OCC=4)]. That is, when two codewords are enabled or used for data transmissions, the entry with an index 3 under the column of "Two Codewords", i.e., [2 layers, port 7-8, $n_{SCID}$=1(OCC=4)], is effective and will be used for transmitting DMRSs in a 2-layer transmission. In another example, an index 5 (message value of 5) under the column of "Two Codewords" corresponds to a DMRS setting of [2 layers, port 11, 13, $n_{SCID}$=1(OCC=4)]. A codeword may represent data before the data is formatted for transmission. One codeword or two codewords may be used for transmission depending on channel conditions, or use cases. $n_{SCID}$ represents a scrambling identity, and may be set to 0 or 1 to indicate the scrambling identity included. The scrambling identity may be skipped if it takes a default value of zero, or no scrambling. In one example, as specified in Table 5.3.3.1.5c-2, section 6.10.3.1 of 3GPP TS.36.212, 4 bits are defined to represent a scrambling identity for antenna ports 7, 8, 11 and 13 when a higher layer parameter dmrs-tableAlt is set to 1. A DCI message may only carry an index (message value) to indicate the corresponding DMRS setting in a lookup table. Taking DCI format 2c as an example, a DCI 2c message including a message value of 6 indicates a DMRS setting in the DCI table 800 (value 6 under the column of "Two Codewords"), where DMRSs will be transmitted for rank 3 (3-layer) transmissions on port 7, 8 and 9 with OCC2 codes. In another example, a DCI 2c message including a message value of 7 according to the DCI table 800 (value 7 under the column of "Two Codewords") indicates that DMRSs will be transmitted for rank 4 (4-layer) transmissions on port 7, 8, 9 and 10, with OCC2 codes used for port 7 and 8, and for port 9 and 10, respectively. A receiver may retrieve the information from the DCI table 800 according to the message value it has received. In these examples, a default DMRS pattern, such as the one shown in FIG. 3, has been predetermined and known to both the transmitter and the receiver. The receiver only needs to know the transmission layers, antenna ports and OCC codes for receiving the DMRSs carried according to the default DMRS pattern.

Figure 9:
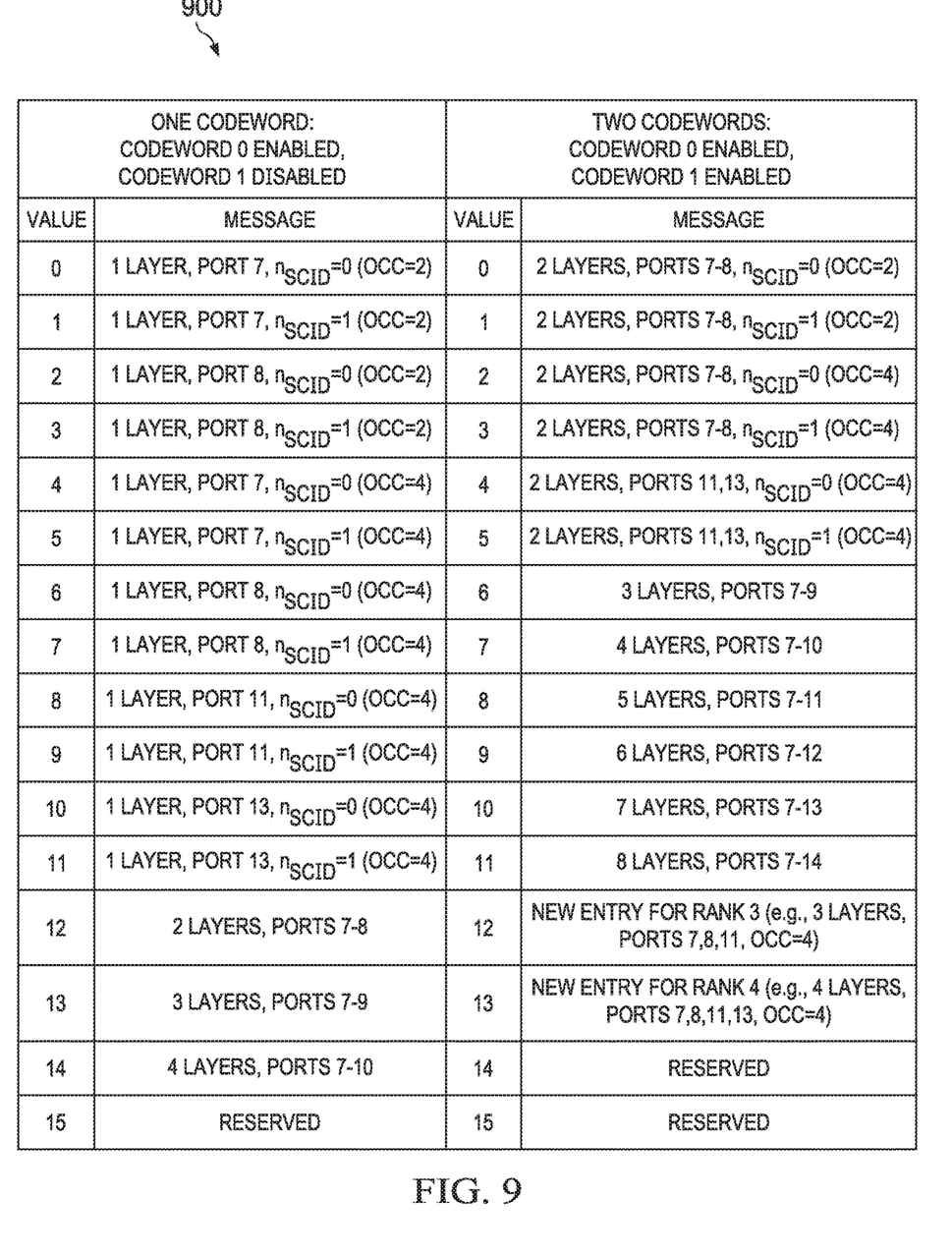
FIG. 9 illustrates another embodiment Lookup table.

DMRS settings for transmitting DMRSs according to the embodiment DMRS patterns with reduced overhead, e.g., DMRS patterns as shown in FIGS. 5-7, may also be specified in a lookup table and communicated to a receiver, e.g., using a DCI message or a RRC message. In some embodiments, a DMRS setting may be added as a new entry in an existing lookup table specified in a technical specification according to a wireless communications standard. For example, a new entry may be added in the DCI table 800 occupying a reserved entry. FIG. 9 illustrates an embodiment DCI table 900 that includes added DMRS settings. The lookup table 900 is reproduced from the lookup table 800 in FIG. 8, but with two new entries added under the column of "Two Codewords" in reserved entries. The DCI table 900 may be understood as a modified DCI table of an existing DCI table. As shown, a new entry is added for rank 3 transmissions corresponding to a message value of 12, and another new entry is added for rank 4 transmissions corresponding to a message value of 13.

In some embodiments, the new entry for rank 3 transmissions may include information about antenna ports to which a 3-layer transmission is mapped to. For example, the antenna ports for rank 3 transmissions may include ports 7, 8 and 9. In another example, the antenna ports may include ports 7, 8 and 11. As discussed above, the antenna ports for rank 3 transmissions may include any three antenna ports from port 7 through port 14. The three antenna ports may be consecutive or non-consecutive. The new entry for rank 3 transmissions may further specify information including a number of transmission layers, i.e., 3 layers, explicitly or implicitly. The new entry for rank 3 transmissions may also include information about an OCC scheme, i.e., an orthogonal code with a length, e.g., an OCC 4. The new entry for rank 3 transmissions may or may not include a scrambling identity, and an arbitrary value of the scrambling identity may be included. As an illustrative example, the new entry for rank 3 transmissions may include information such as [3 layers, ports 7, 8, 11, OCC=4], as shown in FIG. 9. In another example, the new entry for rank 3 transmissions may include information such as [3 layers, ports 7, 8, 9, OCC=4]. Other variations for specifying information in the new entry for transmitting DMRS for 3-layer transmissions according to an embodiment DMRS pattern are possible.

Similarly, the new entry for rank 4 transmissions may include information about antenna ports to which a 4-layer transmission is mapped to. For example, the antenna ports for rank 4 transmissions may include ports 7, 8, 9 and 10. In another example, the antenna ports may include ports 7, 8, 11 and 13. As discussed above, the antenna ports for rank 4 transmissions may include any four antenna ports in port 7 through port 14. The four antenna ports may be consecutive or non-consecutive. The new entry for rank 4 transmissions may further specify information including a number of transmission layers, e.g., 4 layers, explicitly or implicitly. The new entry for rank 4 transmissions may also include information about an OCC scheme, i.e., an orthogonal code with a length of 4, e.g., an OCC 4. The new entry for rank 4 transmissions may or may not include a scrambling identity, and an arbitrary value of the scrambling identity may be included. As an illustrative example, the new entry for rank 4 transmissions may include information such as [4 layers, ports 7, 8, 11, 13, OCC=4], as shown in FIG. 9. In another example, the new entry for rank 4 transmissions may include information such as [4 layers, ports 7, 8, 9, 10, OCC=4]. Other variations for specifying information in the new entry for transmitting DMRS for 4-layer transmissions according to an embodiment DMRS pattern are possible.

In some embodiments, a new entry may also replace an existing entry of an existing lookup table, e.g., the DCI table 800. For example, a new entry of [4 layers, port 7, 8, 11, 13, OCC=4] may replace the entry with a corresponding value of 7 in the DCI table 800 under the column of "Two Codewords". In some embodiments, a new lookup table may be created for including DMRS settings for transmitting DMRSs according to the embodiment DMRS patterns. The new lookup table may be distinguished from an existing lookup table using different table identities assigned. A transmitter may communicate with a receiver whether DMRSs are transmitted according to a new lookup table or an existing lookup table. For example, the transmitter may communicate which lookup table is used by signaling a flag to the receiver, where flag=0 indicates that an existing lookup table is used, and flag=1 indicates that a new lookup table is used; or vice versa. Such a flag may be included in a radio resource control message. Other variations to differentiate one or more new lookup tables from one or more existing lookup tables are possible. When multiple lookup tables specifying DMRS settings are available, each lookup table may be identified by a lookup table identifier. In this case, a transmitter may transmit a lookup table identifier to a receiver to indicate which of the lookup table is used. Thus, the receiver may locate the corresponding DMRS setting in the right lookup table. In one embodiment, a default lookup table may be defined and made known to both the transmitter and the receiver. When the receiver did not receive information about which lookup table is to be used, the receiver may use the default lookup table for locating a DRMS setting.

Figure 10:
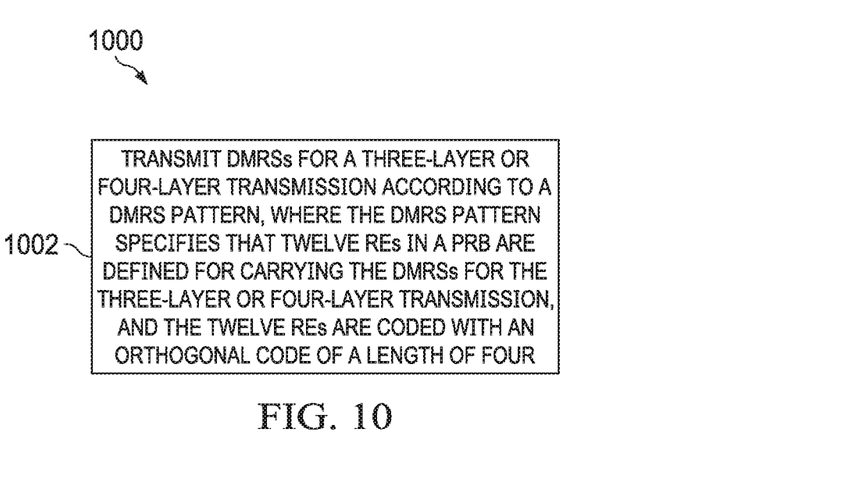
FIG. 10 illustrates a flowchart of an embodiment method for wireless communications.

FIG. 10 illustrates a flowchart of an embodiment method 1000 for wireless communications. The method 1000 may be implemented at an access node, such as a base station. At step 1002, the method 1000 transmits demodulation reference signals (DMRSs) for a 3-layer or 4-layer transmission according to a DMRS pattern. The DMRS pattern specifies that twelve (12) REs in a physical resource block (PRB) are defined for carrying the DMRSs for the 3-layer or 4-layer transmission, where the twelve REs are coded with an orthogonal code of a length of 4. In some embodiments, before the step 1002, the method 1000 may send a DMRS setting to indicate transmissions of DMRSs. In some embodiments, the method 1000 may select or determine a DMRS pattern for a UE, and transmit information about the DMRS pattern to the UE.

Figure 11:
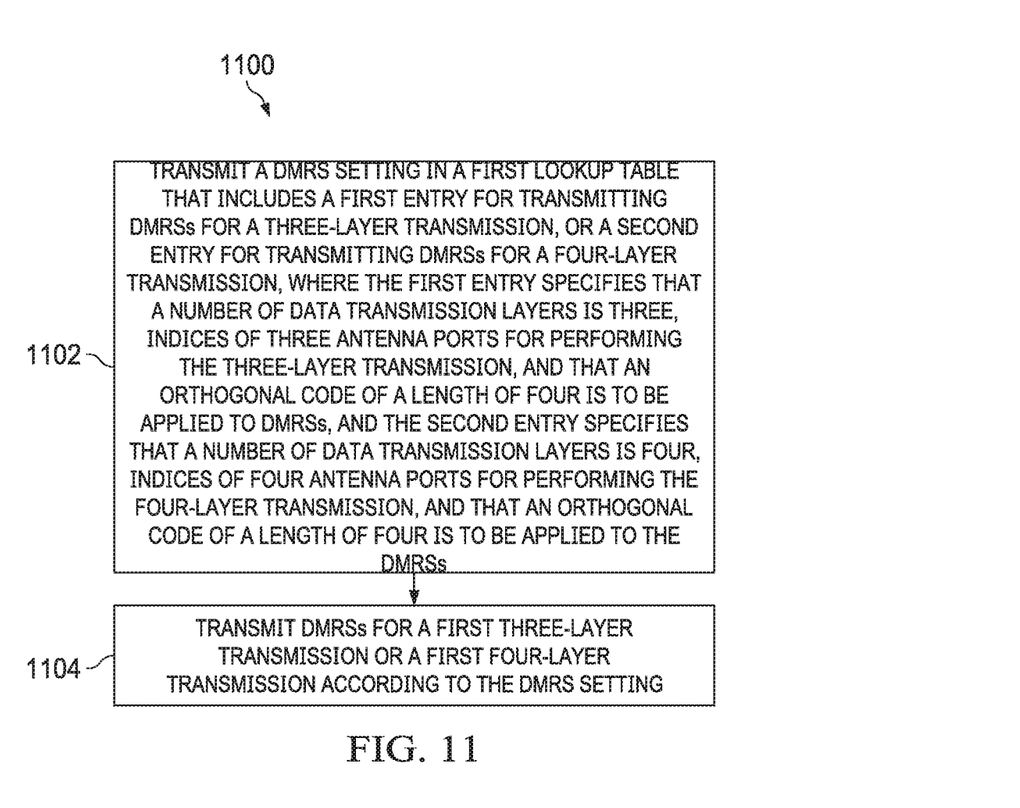
FIG. 11 illustrates a flowchart of another embodiment method for wireless communications.

FIG. 11 illustrates a flowchart of an embodiment method 1100 for wireless communications. The method 1100 may be implemented at an access node, such as a base station. At step 1102, the method 1100 transmits a demodulation reference signal (DMRS) setting in a first lookup table that includes a first entry for transmitting DMRSs for a 3-layer transmission, or a second entry for transmitting DMRSs for a 4-layer transmission. The first entry specifies that a number of data transmission layers is 3, indices of three antenna ports for performing the 3-layer transmission, and that an orthogonal code of a length of 4 is to be applied to DMRSs. The second entry specifies that a number of data transmission layers is 4, indices of four antenna ports for performing the 4-layer transmission, and that an orthogonal code of a length of 4 is to be applied to the DMRSs. The method 1100 may then further transmit, e.g., at step 1104, DMRSs for a first 3-layer transmission or a first 4-layer transmission according to the DMRS setting.

Figure 12:
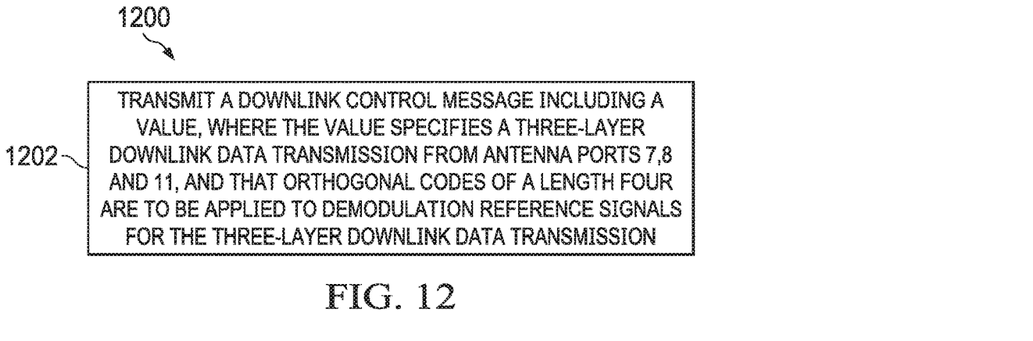
FIG. 12 illustrates a flowchart of yet another embodiment method for wireless communications.

FIG. 12 illustrates a flowchart of another embodiment method 1200 for wireless communications. The method 1200 may be implemented at an access node, such as a base station. At step 1202, the method 1200 transmits a downlink control message including a value, where the value specifies a 3-layer downlink data transmission from antenna ports 7, 8 and 11, and that orthogonal codes of a length 4 are to be applied to demodulation reference signals for the 3-layer downlink data transmission. The method 1200 may then transmit demodulation reference signals for the 3-layer downlink data transmission using the orthogonal codes of length 4.

Figure 13:
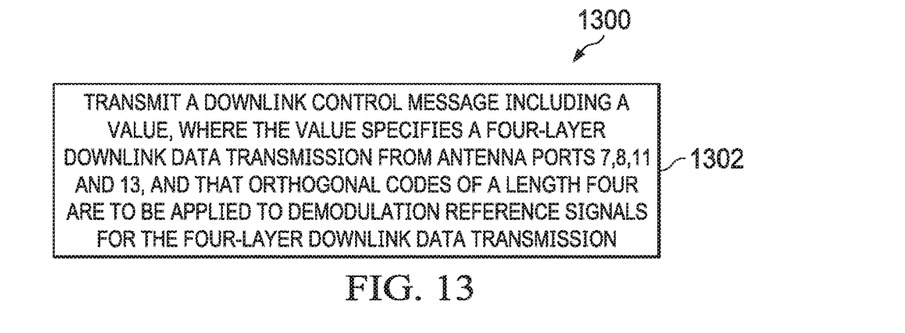
FIG. 13 illustrates a flowchart of yet another embodiment method for wireless communications.

FIG. 13 illustrates a flowchart of yet another embodiment method 1300 for wireless communications. The method 1300 may be implemented at an access node, such as a base station. At step 1302, the method 1300 transmits a downlink control message including a value, where the value specifies a 4-layer downlink data transmission from antenna ports 7, 8, 11 and 13, and that orthogonal codes of a length 4 are to be applied to demodulation reference signals for the 4-layer downlink data transmission. The method 1300 may then transmit demodulation reference signals for the 4-layer downlink data transmission using the orthogonal codes of a length 4.

Figure 14:
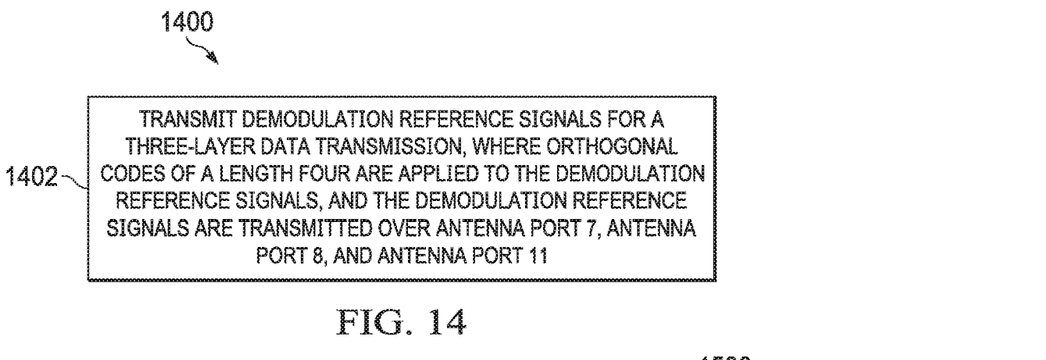
FIG. 14 illustrates a flowchart of yet another embodiment method for wireless communications.

FIG. 14 illustrates a flowchart of yet another embodiment method 1400 for wireless communications. The method 1400 may be implemented at an access node, such as a base station. At step 1402, the method 1400 transmits demodulation reference signals for a 3-layer data transmission, where orthogonal codes of a length 4 are applied to the demodulation reference signals, and the demodulation reference signals are transmitted over antenna port 7, antenna port 8, and antenna port 11.

Figure 15:
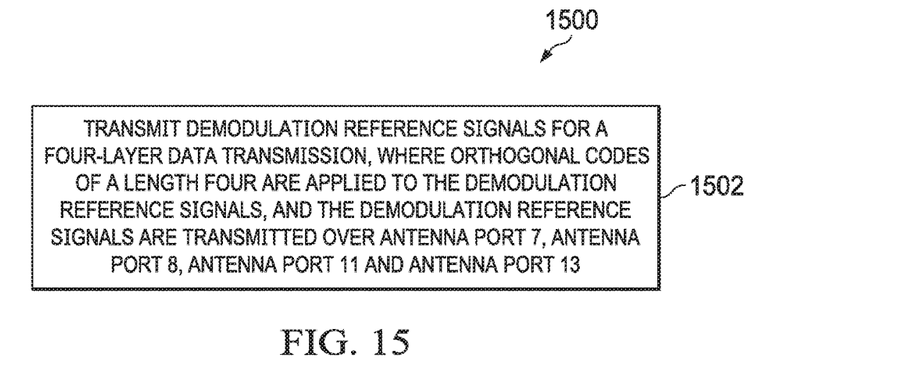
FIG. 15 illustrates a flowchart of yet another embodiment method for wireless communications.

FIG. 15 illustrates a flowchart of yet another embodiment method 1500 for wireless communications. The method 1500 may be implemented at an access node, such as a base station. At step 1502, the method 1500 transmits demodulation reference signals for a 4-layer data transmission, where orthogonal codes of a length 4 are applied to the demodulation reference signals, and the demodulation reference signals are transmitted over antenna port 7, antenna port 8, antenna port 11, and antenna port 13.

Figure 16:
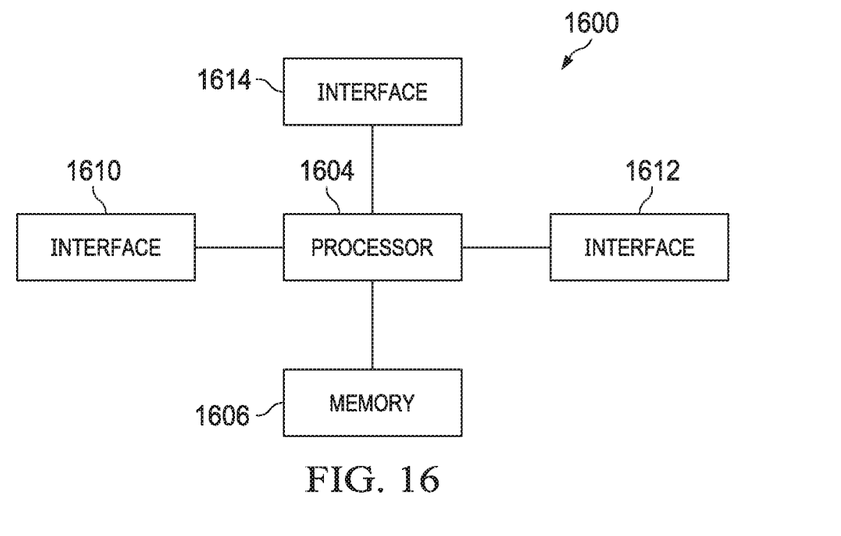
FIG. 16 illustrates a diagram of an embodiment processing system.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
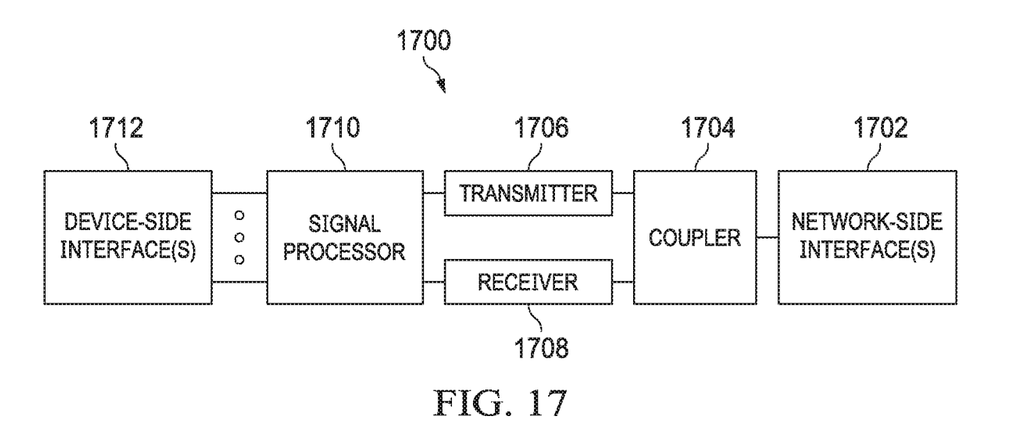
FIG. 17 illustrates a diagram of an embodiment transceiver.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module, a selecting unit/module, an assigning unit/module, an incrementing unit/module, a decrementing unit/module, and/or a setting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
    transmitting, by a base station, a downlink control message comprising a value, the value corresponding to a configuration, and the configuration specifying antenna ports 7, 8 and 11 and a length 4 for orthogonal codes in transmission of demodulation reference signals of 3-layer downlink data transmissions; and
    transmitting, by the base station, a demodulation reference signal of a 3-layer downlink data transmission using an orthogonal code having the length 4 over the antenna ports 7, 8, and 11 according to the configuration.

2. The method of claim 1, wherein the configuration further specifies a scrambling identity of 0.

3. The method of claim 1, wherein the value is effective when two codewords are enabled for the 3-layer downlink data transmissions.

4. The method of claim 1, wherein the orthogonal code comprises [1 1 1 1], [1 −1 1 −1], or [1 1 −1 −1].

5. A method comprising:
    transmitting, by a base station, a downlink control message comprising a value, the value corresponding to a configuration, and the configuration specifying antenna ports 7, 8, 11 and 13 and a length 4 for orthogonal codes in transmission of demodulation reference signals of 4-layer downlink data transmissions; and
    transmitting, by the base station, a demodulation reference signal of a 4-layer downlink data transmission using an orthogonal code having the length 4 over the antenna ports 7, 8, 11, and 13 according to the configuration.

6. The method of claim 5, wherein the configuration further specifies a scrambling identity of 0.

7. The method of claim 5, wherein the value is effective when two codewords are enabled for the 4-layer downlink data transmissions.

8. The method of claim 5, wherein the orthogonal code comprises [1 1 1 1], [1 −1 1 −1], [1 1 −1 −1], or [1 −1 −1 1].

9. A method comprising:
    receiving, by a user equipment (UE), a downlink control message comprising a value, the value specifying antenna ports 7, 8 and 11 and a length 4 for orthogonal codes in transmission of demodulation reference signals of 3-layer downlink data transmissions; and
    receiving, by the UE, a demodulation reference signal of a 3-layer downlink data transmission on the antenna ports 7, 8, and 11 according to the value, wherein the demodulation reference signal is coded with an orthogonal code having the length 4.

10. The method of claim 9, wherein the orthogonal code comprises [1 1 1 1], [1 −1 1 −1], or [1 1 −1 −1].

11. The method of claim 9, wherein the demodulation reference signal for the 3-layer data transmission uses two codewords, and wherein the value is an index of 12.

12. The method of claim 9, further comprising:
using, by the UE, the demodulation reference signal to demodulate a channel.

13. A method comprising:
receiving, by a user equipment (UE), a downlink control message comprising a value, the value specifying antenna ports 7, 8, 11 and 13 and a length 4 for orthogonal codes in transmission of demodulation reference signals of 4-layer downlink data transmissions; and
receiving, by the UE, a demodulation reference signal for a 4-layer downlink data transmission on the antenna ports 7, 8, 11, and 13 according to the value, wherein the demodulation reference signal is coded with an orthogonal code having the length 4.

14. The method of claim 13, wherein the orthogonal code comprises [1 1 1 1], [1 −1 1 −1], [1 1 −1 −1], or [1 −1 −1 1].

15. The method of claim 13, wherein the demodulation reference signal for the 4-layer data transmission uses two codewords, and wherein the value is an index of 13.

16. The method of claim 13, further comprising:
using, by the UE, the demodulation reference signal to demodulate a channel.

17. An apparatus comprising:
a non-transitory memory storage comprising instructions; and
one or more processors in communication with the memory storage, wherein the one or more processors are configured to execute the instructions to cause the apparatus to:
transmit a downlink control message comprising a value, the value specifying antenna ports 7, 8 and 11 and a length 4 for orthogonal codes in transmission of demodulation reference signals of 3-layer downlink data transmissions; and
transmit a demodulation reference signal of a 3-layer downlink data transmission using an orthogonal code having the length 4 over the antenna ports 7, 8, and 11 according to the value.

18. The apparatus of claim 17, wherein the value further specifies a scrambling identity of 0.

19. The apparatus of claim 17, wherein the value is effective when two codewords are enabled for the 3-layer downlink data transmissions.

20. The apparatus of claim 17, wherein the orthogonal code comprises [1 1 1 1], [1 −1 1 −1], or [1 1 −1 −1].

21. An apparatus comprising:
a non-transitory memory storage comprising instructions; and
one or more processors in communication with the memory storage, wherein the one or more processors are configured to execute the instructions to cause the apparatus to:
transmit a downlink control message comprising a value, the value specifying antenna ports 7, 8, 11 and 13 and a length 4 for orthogonal codes in transmission of demodulation reference signals of 4-layer downlink data transmissions; and
transmit a demodulation reference signal of a 4-layer downlink data transmission using an orthogonal code having the length 4 over the antenna ports 7, 8, 11, and 13 according to the value.

22. The apparatus of claim 21, wherein the value further specifies a scrambling identity of 0.

23. The apparatus of claim 21, wherein the value is effective when two codewords are enabled for the 4-layer downlink data transmissions.

24. The apparatus of claim 21, wherein the orthogonal code comprises [1 1 1 1], [1 −1 1 −1], [1 1 −1 −1], or [1 −1 −1 1].

25. An apparatus comprising:
a non-transitory memory storage comprising instructions; and
one or more processors in communication with the memory storage, wherein the one or more processors are configured to execute the instructions to cause the apparatus to:
receive a downlink control message comprising a value, the value specifying antenna ports 7, 8 and 11 and a length 4 for orthogonal codes in transmission of demodulation reference signals of 3-layer downlink data transmissions; and
receive a demodulation reference signal of a 3-layer downlink data transmission on the antenna ports 7, 8, and 11 according to the value, wherein the demodulation reference signal is coded with an orthogonal code having the length 4.

26. The apparatus of claim 25, wherein the orthogonal code comprises [1 1 1 1], [1 −1 1 −1], or [1 1 −1 −1].

27. The apparatus of claim 25, wherein the demodulation reference signal for the 3-layer data transmission uses two codewords, and wherein the value is an index of 12.

28. The apparatus of claim 25, wherein the one or more processors execute the instructions to further:
use the demodulation reference signal to demodulate a channel.

29. An apparatus comprising:
a non-transitory memory storage comprising instructions; and
one or more processors in communication with the memory storage, wherein the one or more processors are configured to execute the instructions to cause the apparatus to:
receive a downlink control message comprising a value, the value specifying antenna ports 7, 8, 11 and 13 and a length 4 for orthogonal codes in transmission of demodulation reference signals of 4-layer downlink data transmissions; and
receive a demodulation reference signal for a 4-layer downlink data transmission on the antenna ports 7, 8, 11, and 13 according to the value, wherein the demodulation reference signal is coded with an orthogonal code having the length 4.

30. The apparatus of claim 29, wherein the orthogonal code comprises [1 1 1 1], [1 −1 1 −1], [1 1 −1 −1], or [1 −1 −1 1].

31. The apparatus of claim 29, wherein the demodulation reference signal for the 4-layer data transmission uses two codewords, and wherein the value is an index of 13.

32. The apparatus of claim 29, wherein the one or more processors execute the instructions to further:
use the demodulation reference signal to demodulate a channel.

* * * * *